United States Patent [19]

Sekiguchi et al.

[11] Patent Number: 5,537,312
[45] Date of Patent: Jul. 16, 1996

[54] ELECTRONIC RACK LABELING SYSTEM

[75] Inventors: Kazuyuki Sekiguchi, Yokohama; Mitsuo Sudou, Tokyo; Takashi Sato, Kawasaki, all of Japan

[73] Assignee: Hitachi, Ltd., Tokyo, Japan

[21] Appl. No.: 238,498

[22] Filed: May 5, 1994

[30] Foreign Application Priority Data

May 6, 1993 [JP] Japan .................................. 5-105263

[51] Int. Cl.⁶ .................................................. G06F 153/00
[52] U.S. Cl. ...................... 364/401 R; 364/403; 235/383
[58] Field of Search ...................................... 364/400, 401, 364/403, 404; 340/825.35; 235/383, 375

[56] References Cited

U.S. PATENT DOCUMENTS

| | | | |
|---|---|---|---|
| 4,002,886 | 1/1977 | Sundelin | 235/383 |
| 4,500,880 | 2/1985 | Gomersall et al. | 340/825.35 |
| 4,603,495 | 8/1986 | Stevens | 40/451 |
| 4,636,950 | 1/1987 | Caswell et al. | 364/403 |
| 4,766,295 | 8/1988 | Davis et al. | 235/383 |
| 4,783,740 | 11/1988 | Ishizawa et al. | 364/403 |
| 4,821,291 | 4/1989 | Stevens et al. | 375/259 |
| 4,962,466 | 10/1990 | Revesz et al. | 395/153 |
| 4,973,952 | 11/1990 | Malec et al. | 340/825.35 |
| 5,021,775 | 6/1991 | Babin | 345/213 |
| 5,111,196 | 5/1992 | Hunt | 340/825.35 |
| 5,151,684 | 9/1992 | Johnsen | 340/572 |
| 5,172,314 | 12/1992 | Poland et al. | 364/401 |
| 5,241,467 | 8/1993 | Failing et al. | 364/401 |
| 5,245,534 | 9/1993 | Waterhouse et al. | 364/404 |
| 5,299,117 | 3/1994 | Farnbach | 364/405 |
| 5,348,485 | 9/1994 | Briechle et al. | 439/110 |
| 5,401,947 | 3/1995 | Poland | 235/383 |
| 5,423,617 | 6/1995 | Marsh et al. | 400/82 |

FOREIGN PATENT DOCUMENTS

| | | |
|---|---|---|
| 62-166497 | 7/1987 | Japan . |
| 64-21571 | 1/1989 | Japan . |
| 0223464 | 1/1990 | Japan . |
| 2-278281 | 11/1990 | Japan . |

*Primary Examiner*—Robert A. Weinhardt
*Assistant Examiner*—Joseph Thomas
*Attorney, Agent, or Firm*—Antonelli, Terry, Stout & Kraus

[57] ABSTRACT

An electronic rack labeling system includes a rack for displaying articles, a display device fixed on a front panel of the rack for displaying label information of the articles displayed on the rack, and a control unit for managing the articles displayed on the rack, preparing label information of the articles displayed on the rack, and displaying the label information at predetermined positions on the display device. The display device displays the rack labels of the articles displayed. The content of display includes a name of article and a price. When a display position of the article is changed, the display position of the rack label is changed accordingly, and when the price of the article is changed, the updated price is displayed. The change of the display position and the display content is centrally controlled by a computer.

16 Claims, 7 Drawing Sheets

| | | | GOODS INFORMATION | | | | POSITION INFORMATION | | |
|---|---|---|---|---|---|---|---|---|---|
| 31 RACK NO. | 32 SHELL NO. | COL-UMN NO. | 33a NAME OF GOODS | 33b UNIT PRICE | 33c GOODS PLAN | 33d FACE NUMBER | 34a FACE WIDTH | 34b LEFT END POSITION | 34c RACK LABEL DISPLAY POSITION |
| A01 | 01 | 01 | APPLE | ¥50 | 49828.. | 01 | 20 | 0 | |
| A01 | 01 | 02 | ORANGE | ¥30 | 49263.. | 02 | 40 | 20 | |
| A01 | 01 | 04 | LETTUCE | ¥198 | 49273.. | 02 | 40 | 60 | |
| .. | .. | .. | .. | .. | | | | | |

ELECTRONIC RACK LABELING SYSTEM

BACKGROUND OF THE INVENTION

Field of the Invention

The present invention relates to an electronic rack labeling system for displaying electronic labels on a rack on which articles are placed, and more particularly to an electronic labeling system for electronically displaying prices of goods on goods display racks arranged in a store such as a supermarket. The present invention further relates to an electronic rack labeling system useful for efficient operation of a store such as in the event of change of display of goods, stock taking and ordering of supply.

Labels for displaying information to identify articles displayed on an article rack (hereinafter referred to as rack labels) are used in most stores and warehouses. The rack label is a small card made of paper on which name of article, feature of article and price are entered. Where such a paper card is used as the rack label, a huge amount of manpower is required to move and change the labels in order to change the display positions of the articles and to change the prices of the articles. When failure of change occurs, the articles may not be properly managed. In order to avoid the above problems, as disclosed in JP-A-62-166497, it has been proposed to provide electronic price display devices (rack price tag devices) on the display rack, transmit prices changed by a POS information management terminal to the electronic price display devices through an ultrasonic wave and automatically display the transmitted prices so that the contents of display of the rack labels are changed. It discloses the change of the prices of the electronic price display devices and the displays of the changed prices but it does not disclose the change of the display positions.

On the other hand, JP-A-2-278781 discloses a rack label constructed of an electronic price display device which is physically moveable along an entire surface of a rack. This electronic price display device is of cordless type which contains a power supply, an antenna and a receiver in a case and receives a command transmitted by wireless to display a price, change the displayed price, (display the changed price) and erase the price. The electrical price display device is fixed on the display rack and is physically moveable so that it may by repositioned manually.

SUMMARY OF THE INVENTION

The inventors of the present invention analyzed the prior art problems and found the following issues.

For example, in a store, an operation of changing display of goods such as change of display positions of goods and increase or decrease of amounts of certain goods is frequently carried out. In such a case, as the face width of displayed article (width of occupation, as viewed from the front of the rack, of a rack shell by one type of articles which face the front side of the display rack) increases or decreases due to the change of the display of the goods, it is necessary to manually move and change the positions of the electronic rack labels in order to display the rack labels at the positions corresponding to the centers of the face widths.

Further, in the prior art, no consideration is paid to the efficient use of the rack labels in the change of the display of goods, the stock taking and the ordering. This is further discussed below.

In the change of the display of goods, a plan to change the display is usually designed by a facing control system (goods display plan support system) which is installed in a computer. For the display plan, reference may be made to JP-A-64-21571 and JP-A-2-23464. A change command of the display plan is usually printed out on a sheet and the names of goods to be displayed are indicated from left to right, for example, for each shell of each rack. Operators move the goods while they watch the instruction sheet, but the work may not be efficiently done when the amount of information contained in the instruction sheet is large.

Further, no attention has been paid to the automation of the change of the positions of the rack labels as well as the improvement of efficiency of the manpower required for works such as the change of display of goods, the stock taking and the ordering. Since the operators work while they watch the stock taking instruction sheet on which the display rack numbers of goods or the names of particular goods on the display rack are described, the work is not done efficiently when the amount of information contained in the instruction sheet is large, as it is in the change of the display of goods. In the ordering, the operators must work while they carry order books or portable terminals, which causes a problem in the efficiency of work.

It is an object of the present invention to provide an electronic rack labeling system which solves the prior art problems and allows electronic repositioning of the rack labels to positions corresponding to goods when the display of goods is changed.

It is another object of the present invention to provide an electronic rack labeling system capable of improving work such as the change of display of articles, the stock taking and the ordering.

In order to achieve the above objects, the electronic rack labeling system of the present invention is characterized as follows:

A display device for visually displaying rack labels which display names of goods displayed and attributes (prices, etc.) thereof is arranged on a front side (a side from which a user accesses a display rack) of each shell of the display rack on which articles are displayed in a store or warehouse. The display device may display a plurality of rack labels and it is physically fixed to the rack. The display device preferably has a dimension which continuously extends over the entire display rack but a plurality of electronic display device may be arranged at predetermined intervals. The rack labels displayed on the display device are centrally controlled by a computer. In order to determine the positions to display articles, a display status table is prepared on the computer and managed thereby. The computer calculates the positions to display the rack labels on the display device on the display rack based on the display status table and prepares image information of the labels to be displayed. The prepared image information is sent to an electronic rack labeling control unit which controls the display of the rack labels, and it is displayed on the display device on the display rack.

The present invention is further characterized by displaying on the display device an instruction of work such as the changing of display status of articles displayed on the display rack, the stock taking of the articles displayed (arranged) on the rack and the ordering. The instruction for the change of display is prepared by the comparison of the article display plan data and the current article display data, and the information on the work instruction is displayed at a corresponding position on the display device.

In displaying the rack labels of articles, the display positions of articles are determined by a facing control system (for example, article display plan support system), and the electronic rack label control unit prepares image information to be displayed and sends it to the display rack so that it is displayed on the display device of the display rack. In this manner, the rack label information may be automatically repositioned in accordance with the change of the display of articles and the manpower for the work of changing the rack labels is saved.

In changing the display status, a display plan table is prepared by the facing control system and it is compared with a display status table stored in a memory to prepare instruction data for the work of changing the display. The instruction data for the work to change the display is displayed on the display device of the display rack as the instruction to the work to change the display. Operators change the display status of articles in accordance with the contents of the instruction to the work. After the work, the rack labels are displayed on the display device in accordance with the changed status of display.

In the stock taking, positions of articles to be taken are extracted from a stock taking plan data table and the display status table, and the extracted position information and stock taking instruction data are displayed on the display device. Operators carry out the stock taking in accordance with the contents of the work instruction. In this manner, the operators may carry out the stock taking while they watch the rack labels displayed at the corresponding articles and the work efficiency is improved.

DESCRIPTION OF THE PREFERRED EMBODIMENTS

An embodiment in which the electronic rack labeling system of the present invention is applied to a store such as a supermarket store is discussed below in detail.

Figure 1:
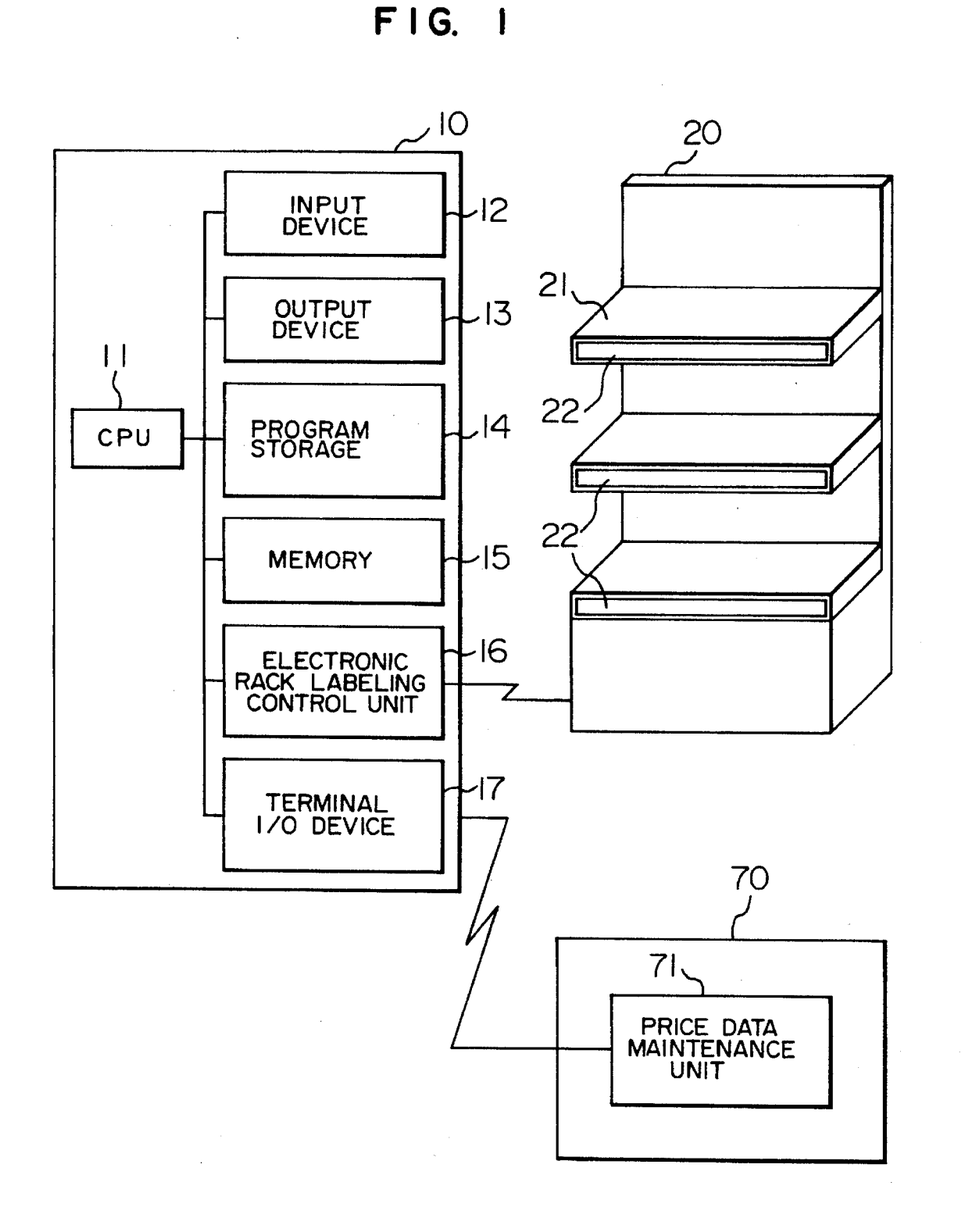
FIG. 1 shows an embodiment of a hardware configuration of an electronic rack labeling system of the present invention.

In FIG. 1, a computer 10 controls the display of the electronic rack labels of the present embodiment and comprises the following elements. A central processing unit (CPU) 11 issues processing instructions to respective units to arithmetically operate numerics. An input device 12 receives input and instruction from an operator, and it may be a keyboard, a mouse or a bar code entry device. An output device 13 displays message and menu to the operator to instruct and guide the operator, and it may be a display device for displaying on a screen or a printer for printing out on a sheet. A program storage 14 stores a program for effecting a facing control system to prepare a goods display plan based on actual sales by goods, rack layout, display rack information and goods information in order to improve efficiency at a point of sales. The facing control system may use a known technique. A memory 15 stores a display plan table designed by the present system and it may be a storage device such as a magnetic disk drive. An electronic rack labeling control unit 16 determines display positions of rack labels based on the information of the display plan table, prepares image information to be displayed, and transmits it to the display rack with designation of a display position. A terminal input/output device 17 is an interface with a point-of-sales (POS) information management terminal 70 which manages sales trend for each of the goods handled by the store. It may be a POS system practically used in a supermarket store. The POS information management terminal 70 includes a price data maintenance unit 71 to manage a price for each of goods.

A display rack 20 on which the goods are displayed is an improvement over a goods display rack commonly used in the supermarket store and has a plurality of shells 21 for holding goods. In FIG. 1, three shells are shown. Paper labels which indicate prices of goods are normally applied to a front panel of each shell 21, but in the present embodiment, a display device 22 which can electronically display information is arranged in place of the paper labels. As shown, the display device has substantially the same dimension as that of the front panel of the shell and it may be embodied by a liquid crystal display or an LED display. The dimension of the display device may be arbitrary and it may be set in accordance with the dimension of the conventional paper label. The display of the image information on the display device 22 is controlled by the electronic rack labeling control unit 16.

While only one display rack 20 is shown in FIG. 1, a plurality of display racks in the store are actually connected to the computer 10.

Figure 2:
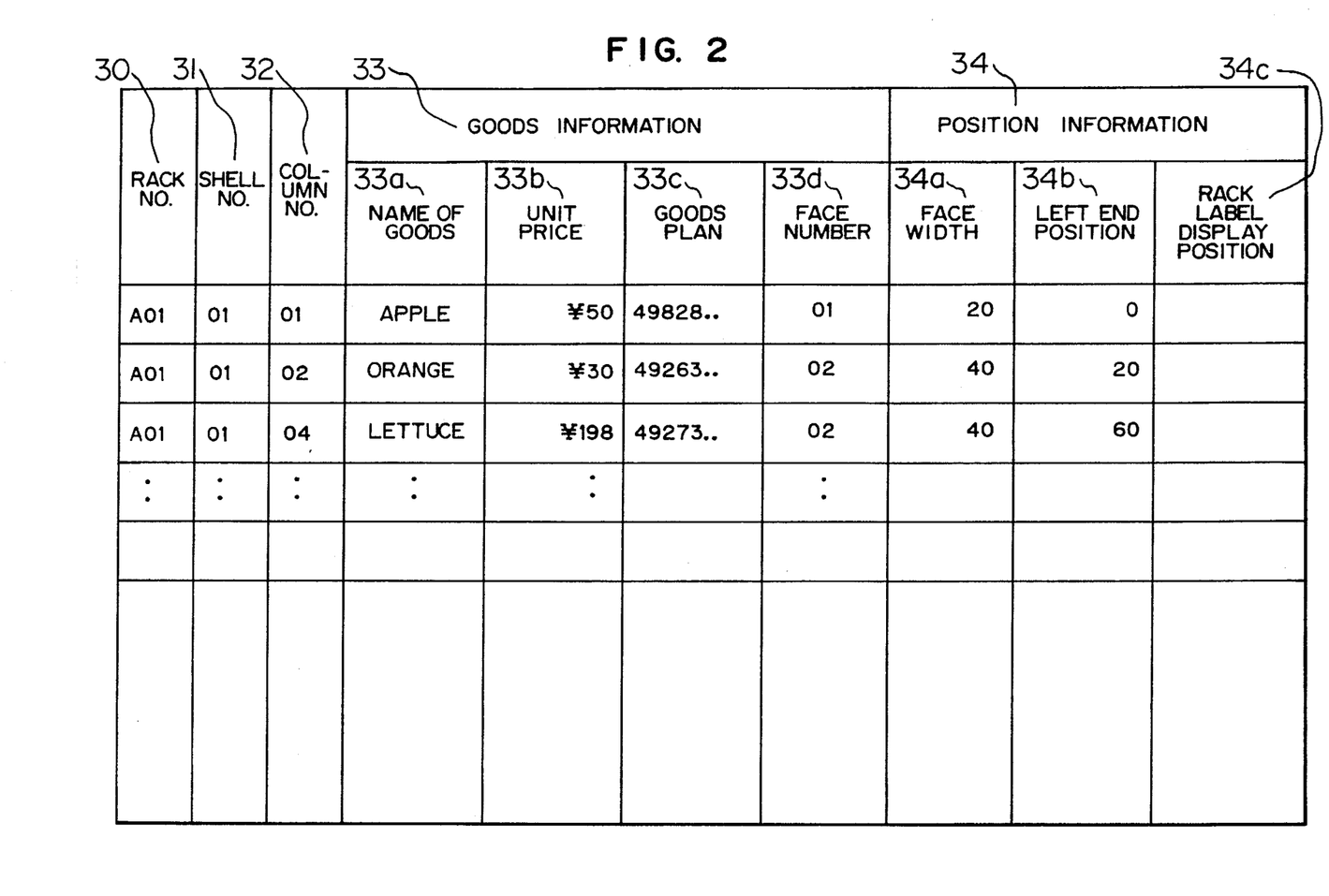
FIG. 2 shows an embodiment of a data format of a display status table of an article display rack of the present invention.

FIG. 2 shows an example of a data format of a display status table of the display rack stored in the memory 15 of the present invention. A rack number 30 indicates an identification number of one of a plurality of goods display racks 20. Numbers A01, A02, . . . are assigned to the respective racks. A shell number 31 indicates a particular shell in the display rack, and 01 indicate a first one from the top, that is, the topmost shell. A column number 32 indicates a particular one of columns formed for each face of the rack, starting from a left end, and column 1, column 2, . . . are assigned starting from the left. Assuming that the width of the rack is 240 cm, 12 columns are managed with each face (column) being of 20 cm wide. The unit of face is arbitrary but where partitioning plates are included in the rack, the unit of face may be set to fit to the partitioning plate interval to facilitate the change of the display position of the goods to be described later. The face may be controlled by a length (cm). For each column number 32 designated, goods information 33 of the goods to be displayed and position information 34 are stored. The goods information 33 comprises names of goods 33a to be displayed, unit prices 33b of goods, goods specifications 33c which are information indicating goods codes and units of order, and face numbers 33d which indicate occupation areas of one type of goods displayed as viewed from the front of the display rack. The position information 34 comprises a face width 34a which indicates a lateral width (in cm) on the shell occupied by the face number 33d as viewed from the front, and a left end position 34b which indicates a displacement (in cm) of the goods from the left end of the shell. Those information are information items of the display plan table prepared by the operator by the facing control system. A rack label display position 34c is an item calculated based on the information of those information items and stored at a display position of the rack label.

Figure 3:
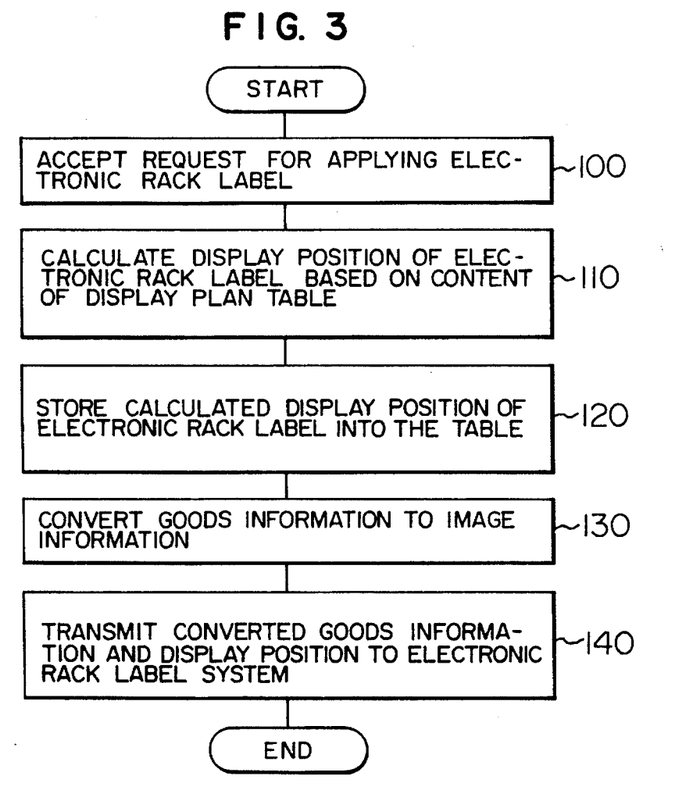
FIG. 3 shows a flow chart of a process of providing electronic labels of the present invention.

Referring to a flow chart of FIG. 3, a process of applying the electronic labels is explained.

First, when the display position of the goods is determined by the facing control system, the operator selects a process item of the electronic rack labelling from a menu displayed on the output device 13 of the computer 10 to apply (display) the electronic rack labels. The CPU 11 accepts the electronic rack labelling request from the input device 12. When the CPU 11 instructs the application of the electronic rack labels to the electronic rack labeling control unit 16, the electronic rack labeling control unit 16 extracts the face width 34a and the left end position 34b stored in the display status table of the memory 15 and calculates the display positions of the electronic rack labels so that the electronic rack labels are displayed at the centers of the face widths of the displayed goods (step 10). A calculation formula is given by;

(display position 34c)=(left end position 34b)+0.5×(face width 34a)

The determined display positions of the electronic rack labels are stored in the display status table stored in the memory 15 (step 120). Then, the electronic rack labeling control unit 16 extracts the names of goods 33a and the unit prices 33b which are goods information of the goods from the memory 15 and converts them to the image information to be displayed on the display device 22 (step 130). Then, the electronic rack labeling control unit 16 transmits the image-converted goods information and the rack label display positions to the display rack 20 to display the rack labels at the display positions of the required electronic rack labels (step 140).

Figure 9:
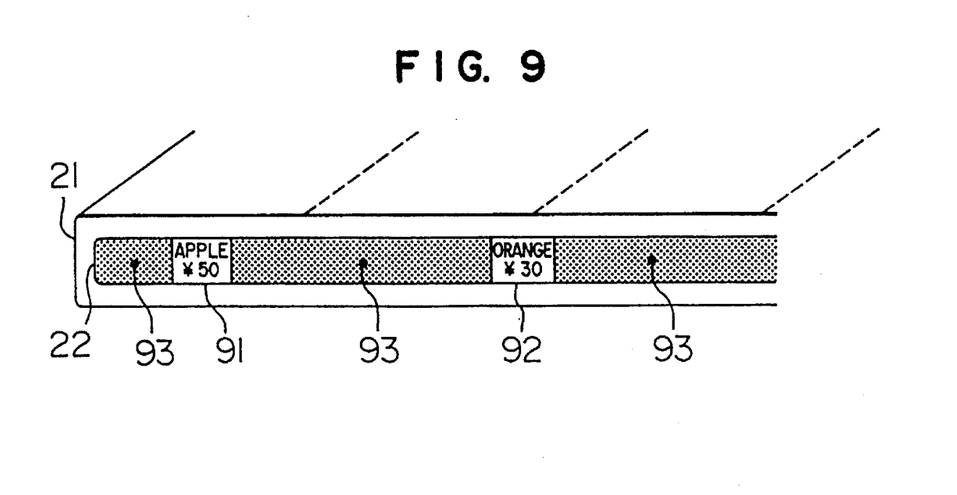
FIG. 9 shows an example of display on the display device of the present invention.

Referring to FIG. 9, the image information to be displayed on the display device 22 is explained. FIG. 9 shows three faces of the shell 21 from the left end. In FIG. 9, broken lines indicate boundaries between faces. Since the name of goods "Apple" is to be displayed at the first face from the left end, image information 91 is displayed at a center of that face. Since the goods "Orange" needs two faces to display, image information 92 is displayed at a center of the two faces. In FIG. 9, the display device 22 includes an undisplayed area 93 in which various information such as related information (for example, "special sale" or "25% off") may be displayed. In the present embodiment, since the application of the rack labels may be attained by merely issuing an instruction by an operator to the computer 10, the application of the rack labels can be efficiently carried out compared to the prior art system.

In the above embodiment, the present invention is applied to the display of the electronic rack labels but the display may be applied to the improvement of the efficiency of other store works.

Figure 4:
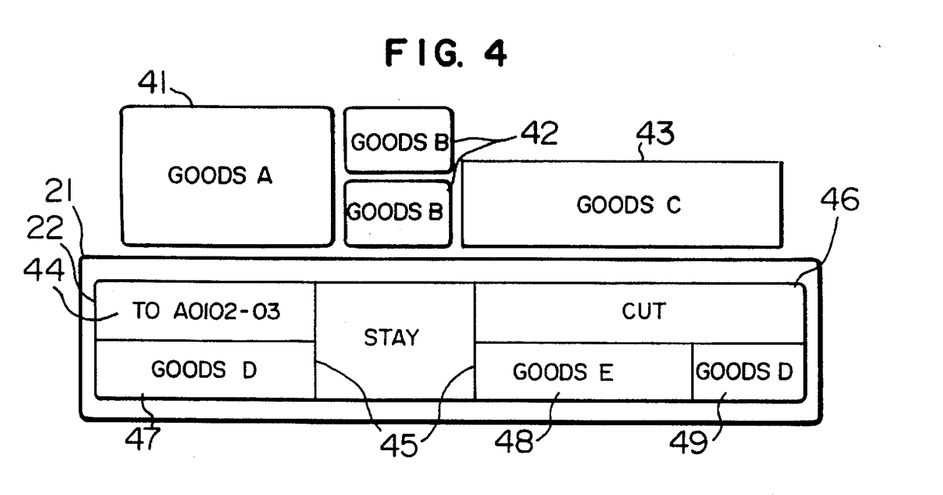
FIG. 4 shows a display of an instruction to change a display status on a display unit.

For example, when the displays of the goods are to be changed, the work instructions may be displayed on the electronic rack labels so that the work to change the displays of the goods can be efficiently carried out. FIG. 4 diagrammatically shows a manner of the display rack in which the content of the work to change the displays is displayed on the display device of the display rack.

The display rack 21 is a front panel of one shell of the display rack shown in FIG. 1. Goods A 41, B 42 and C 43 are displayed on the display rack from the left to the right. As seen from FIG. 4, the goods A 41 occupy two faces, the goods B 42 occupy one face, and the goods C 43 occupy three faces, and one shell provides six display faces in total. Numeral 22 denotes a display device of the display rack located on the front panel of the shell. In FIG. 4, the display device 22 is drawn in an enlarged scale. In a normal goods display mode, the rack labels are displayed on the display device 22 as shown in FIG. 9, and when the work to change the display positions of the displayed goods by the store attendants is to be carried out, the display is changed as shown in FIG. 4. The display device 22 is divided into an upper half and a lower half, and the next display positions (move-to addresses) of the goods currently displayed are displayed on the upper half and the names of goods to be newly displayed are displayed on the lower half. In FIG. 4, an area 44 indicates that the next display position of the goods A 41 is the second (02) position from the top on the rack A01, the third (03) face from the left. An area 47 indicates that the goods D are to be displayed in the area where the goods A have been displayed. For the goods B, "Stay" is displayed because the display position is not changed. Boundary lines 45 to indicate the ranges of display of goods are also displayed. Since the goods C are to be removed (stop to display) from the display rack, "Cut" is displayed in an area 46. Since goods E and F are to be newly placed in the area where the goods C have been displayed, that is displayed in areas 48 and 49.

Figure 5:
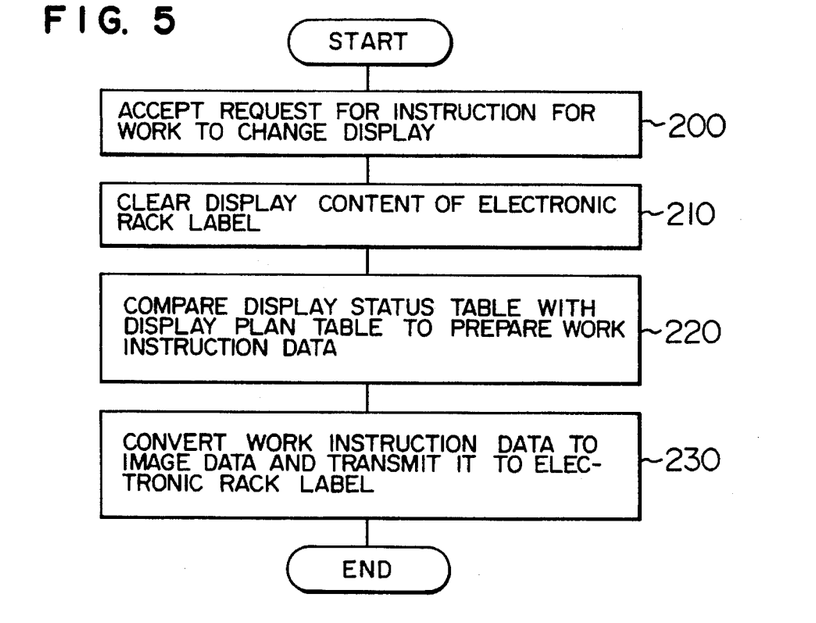
FIG. 5 shows a flow chart of a process to change the display status in accordance with the present invention.

Referring to the flow chart of FIG. 5, a process of the work to change the display is explained.

First, the operator selects a process item to instruct the work to change the display of goods from the menu displayed on the output device 13 of the computer 10 and designates the changes through the input device 12. The CPU 11 accepts the request to change the display of goods from the input device 12 (step 200). Then, the CPU 11 instructs the electronic rack labeling control unit 16 to clear the display content of the electronic rack labels (step 210). Then, a goods display plan table which indicates the positions of the goods after the change is prepared in the memory 15 and it is compared with a goods display status table which represents the current display positions of goods. The goods to be cut, the goods to be repositioned and the positions to be moved to, and the goods not to be repositioned are extracted and data to instruct the work to change the display is prepared. The CPU 11 calculates the positions to display the work instruction based on the position information of the goods (step 220). The formats of the two goods display tables with rack label display positions are identical and they are one shown in FIG. 2. The electronic rack labeling control unit 16 then converts the work instruction data to image data as shown on the display device 22 of FIG. 4, transmits it to the display rack 20 to display the content thereof on the display device 22 (step 230). The operators carry out the work to change the display of goods in accordance with the instruction displayed on the electronic rack labels. When the work is completed, the work instruction displayed on the electronic rack labels is cleared and the electronic rack labels of the goods changed through the process of FIG. 3 are displayed.

In the present embodiment, since the work instruction to change the display is displayed directly on the goods display rack, the operators are released from the work to be conducted while they watch the work instruction data printed out on the sheet. Further, since the prices after change are displayed at the bottom of the display device 22, the work to change the display can be carried out efficiently. In the above description, the move-to addresses of the goods are displayed on the electronic rack labels by the reference position information. Alternatively, the work may be instructed by displaying a particular name of goods such as "Goods A on shell 1" instead of the reference position information. For the goods to be cut or the goods not to be repositioned, they may be colored such as red for the goods to be cut and blue for the goods not to be repositioned so that the operators may recognize them at a glance.

Figure 6:
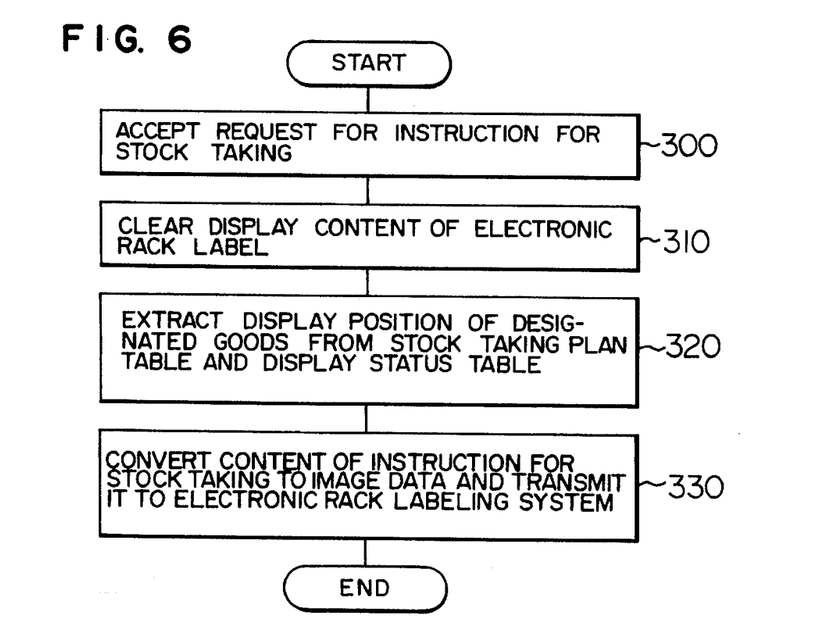
FIG. 6 shows a flow chart of a process of stock taking of the present invention.

Referring to the flow chart of FIG. 6, an embodiment in which the electronic rack labels are applied to the stock taking is explained. First, the operator selects a process item to request the instruction for the stock taking from the menu displayed on the output device 13 of the computer 10. The CPU 11 accepts the request to instruct the stock taking from the input device (step 300). When the CPU 11 instructs to the electronic rack labeling control unit 16, the electronic rack labeling control unit 16 first clears the content of display of the electronic rack labels (step 310). Then, it extracts the display positions of goods for the stock taking from a stock taking work plan table (not shown) which contains the information on the goods for the stock taking and the display status table (step 320). The extracted position information and the content of the instruction of the work of stock taking are converted to image data which is transmitted to the display rack 20 and displayed on the display device 22 (step 330). The work plan table (not shown) and any information stored in the display status table may be displayed on the display device. For example, the number of goods currently displayed may be displayed. The operators count the goods displayed in accordance with the instruction displayed on the electronic rack labels and enter the name of goods and the number thereof by a handy terminal. After the completion of the stock taking, the work instruction displayed on the electronic rack labels is cleared and the goods information and prices are displayed again from the display status table. In the present embodiment, since the operators carry out the work while they watch the content of instruction displayed on the electronic rack labels, the work is carried out efficiently.

In the above description, the electronic rack labels are used to display the work instruction of the stock taking and the number of goods, it may also be used for the supply ordering of goods.

Figure 7:
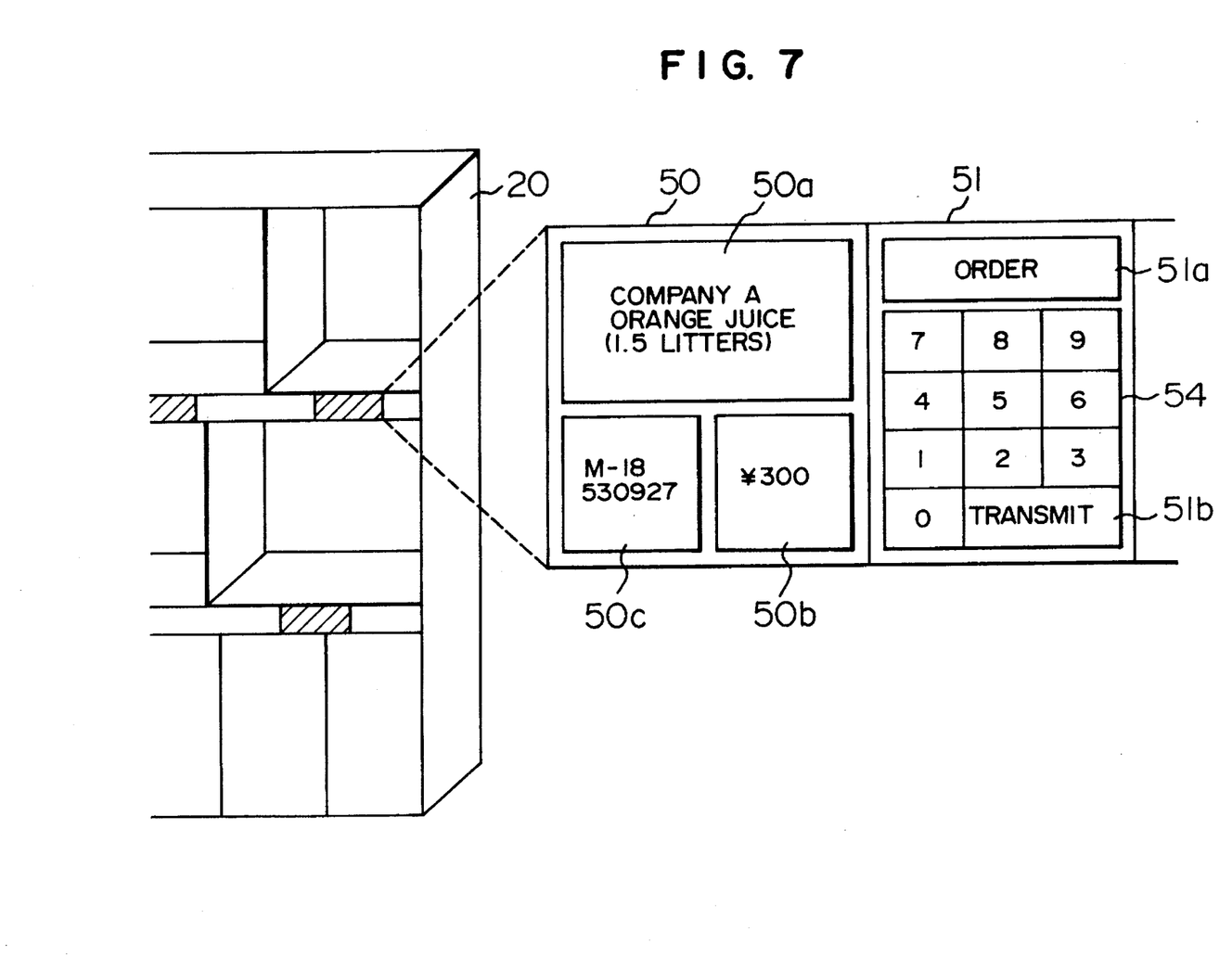
FIG. 7 shows another embodiment of the present invention including an electronic rack labels and input function on a display device.

While the electronic rack labels are used to instruct the work in the above embodiment, the display device 22 of the display rack 20 may be combined with a touch panel so that the entry of information may be allowed from the display rack 20. Thus, the display rack having an integrated display device and input device may be applied to the stock taking and the ordering of the store work, as illustrated in FIG. 7. The electronic rack labels 50 comprise, as the display function, a name of goods 50a, a unit price 50b and goods specification 50c representing goods code and a unit of order, and the touch panel 51 comprises, as the input function, an order area 51a for entering the start of order of supply of goods and a ten-key pad 54 for entering the number in the stock taking and the supply ordering, and a transmit button 51b. The touch panel may be arranged over the entire surface of the display device 22 so that the movement of the touch panel due to the movement of the display position of the electronic rack label may be controlled. By such a construction, the number of goods in the stock taking explained in the flow chart of FIG. 6 may be entered on site without using the handy terminal. Further, the operator may enter the number to be ordered through the touch panel based on the goods specification displayed on the electronic rack label while he/she watches the sales trend of the goods. Thus, the work may be carried out without carrying the order book or the handy terminal and the efficiency of the ordering is improved.

Figure 10:
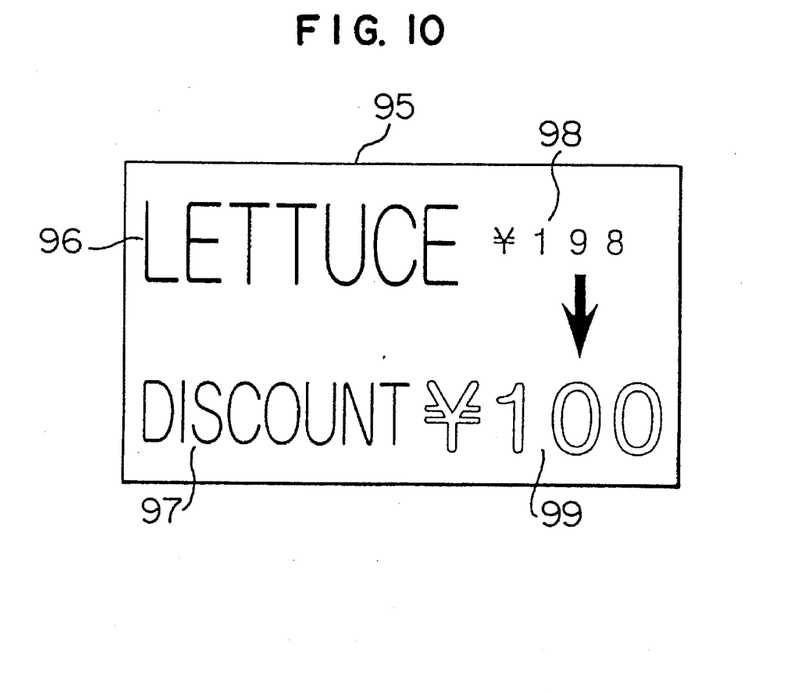
FIG. 10 shows an example of display in another embodiment of the present invention which is applied to a price discounting work.

An embodiment in which the electronic rack labeling system is applied to a price discounting work of the goods in a supermarket store is now explained. The POS information management terminal 70 of FIG. 1 manages the sales trend of each of goods handled by the store. Depending on the sales trend, it may be desired to sell goods with a discounted price. In this case, the discount price of goods is determined by the POS information management terminal 70 and the data in the price data maintenance unit 71 is updated. The data of the price data maintenance unit 71 is sent to the computer 10. When the CPU 11 receives the updated data, it changes the unit price 33b of the corresponding goods in the display status table shown in FIG. 2 and the image information for the updated price is prepared by the electronic rack labeling control unit 16. The display of the image information is shown in FIG. 10. The image information is displayed in an area 95 of the display device 22 and a name of goods 96, an indication of discount 97, a price before discount 98, a price after discount 99 are displayed. The indication 97 which is the discount indication to attract attention of consumers may be displayed with a different color (for example, in red) or the entire area 95 or a portion thereof may be flashed. Other related information, for example, "Big discount immediately before closing" or "Half price" may also be displayed. Thus, the work to apply discount seals which is daily carried out in fresh fish and meat departments of the supermarket store is saved, and since the change of the price of goods is done by the POS information management terminal 70, the price data of electronic registers (not shown) may be immediately changed by the rack labels and the work efficiency is improved.

While the present invention has been showed and described with the preferred embodiments, it should be understood that the present invention is not limited thereto but the embodiments may be changed without departing from the gist of the invention.

Figure 8A:
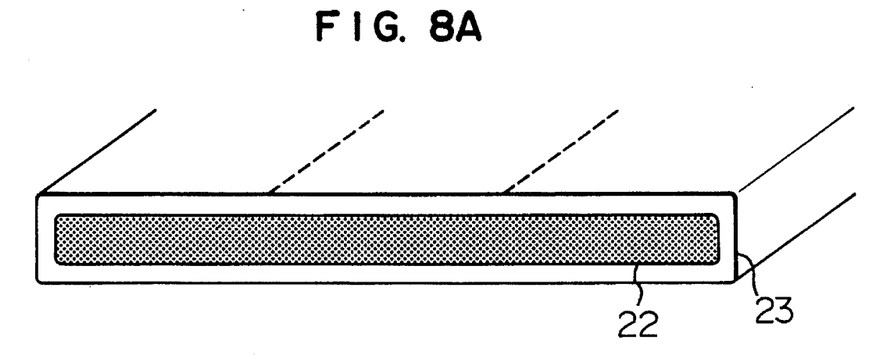
FIGS. 8A and 8B show examples of display on the display device of the present invention.
Figure 8B:
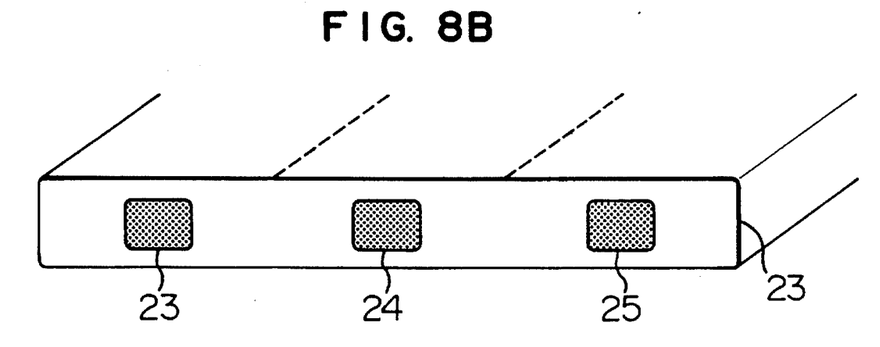

For example, as shown in FIG. 8A, one elongated belt-shaped display device 22 which is capable of displaying a plurality of rack labels may fixedly arranged on the entire front panel of the shell 21 of the display rack 20. Where such a contiguous display is provided, the rack labels may be electronically repositioned within the display range of the display device 22 although the display device 22 is physically fixed. Further, as shown in FIG. 8B, display devices 23, 24 and 25 each capable of displaying one rack label are arranged on the front panel of the shell 21 and the activation of one of the display devices is determined by the computer 10 so that the display position may be electronically repositioned. In such a distributed display, if same goods are displayed at the second and third faces from the left, the same information may be displayed on the display devices 24 and 25. In this manner, the cost required for the display device can be reduced.

The electronic rack labels may also be used for sales promotion purpose. For example, the goods of cheaper prices than ordinary prices managed by the computer are determined by the program and the display images on the display device 22 are flashed or displayed in a different color so that the consumer may recognize which ones of the displayed goods are at good prices. Further, voice may be linked to the display.

In accordance with the present invention, the work to change the positions of the electronic rack labels is carried out not by repositioning the labels themselves (physical reposition) but by the change of display positions on the display device (electronic reposition) so that the efficiency of the work to change the rack labels is improved. Further, through the use of the electronic rack labels, the instruction to change the display status of the goods, the stock taking and the ordering may be displayed so that the efficiency of the work of store work by the store attendants is improved.

What is claimed is:

1. An electronic rack labeling system comprising:

a rack for displaying a plurality of different kinds of articles at a plurality of respective article display locations extending along the length of said rack, each article display location having a length selected in view of the articles to be displayed at such article display location;

information display means extending along substantially the length of a front panel of said rack for displaying an electronic display of article information, including identification information identifying articles displayed on said rack at said plurality of article display locations and price information indicating the price of the identified articles;

preparing means for preparing article information about each of the different kinds of articles displayed on said rack for display on said information display means;

control means for determining an information display position adjacent each article display location for display of the prepared article information about the articles displayed at such article display location; and output means for applying a signal indicative of the determined information display positions and the prepared article information to said information display means for an electronic display of the prepared article information for each of the kinds of displayed articles at the determined information display positions for such kinds of articles.

2. An electronic rack labeling system according to claim 1, wherein said preparing means prepares at least some of the article information as image information to cause said display means to display images.

3. An electronic rack labeling system according to claim 1, wherein said rack includes a plurality of shells and said display means includes an electronic display member on a front panel of each shell.

4. An electronic rack labeling system comprising:

a display rack having a shell for displaying a plurality of different kinds of articles at a plurality of respective article display locations extending along the length of the shell, each article display location having a length selected in view of the articles to be displayed at such article display location, and having electronic information display means extending along substantially the length of a front panel of said shell, on an information display device;

article information management means for storing article information about articles displayed on said shell;

preparing means for preparing article information about each of the different kinds of articles displayed on said shell on the basis of the article information stored in said article information management means, the prepared article information including identification information identifying articles displayed on said shell and price information indicating the price of the identified articles;

determining means for determining an information display position on said information display device adjacent each article display location for electronic display of the prepared article information about the articles displayed at such article display location; and control means for controlling the electronic display of the prepared article information at the display positions determined by said determining means.

5. An electronic rack labeling system according to claim 4, wherein:

the article information further includes position information indicating display positions of the articles; and said determining means changes the display positions of the prepared article information on said display device when the position information indicates that the display positions of the articles are changed.

6. An electronic rack labeling system according to claim 5 wherein said control means causes the simultaneous display of both the positions of the articles before change and the positions of the articles after change.

7. An electronic rack labeling system according to claim 4, wherein:

said preparing means changes the price information when the prices of the articles are changed; and said control means causes the simultaneous display of both the prices of the articles before change and the prices of the articles after change.

8. An electronic rack labeling system according to claim 7, wherein the changed price information includes identification of the changed price as a discount price.

9. An electronic rack labeling system according to claim 4, wherein the article information further includes position information indicating display positions of the articles.

10. An electronic rack labeling system according to claim 9, wherein said control means causes the simultaneous display of both the positions of the articles before change and the positions of the articles after change.

11. An electronic rack labeling system according to claim 4, wherein said identification includes names of the articles displayed.

12. A method of providing an electronic display of article information about a plurality of different kinds of articles displayed at a plurality of respective article display locations extending along the length of a rack, each article display location having a length selected in view of the articles to be displayed at such display location, said rack having electronic display means extending along substantially the length of a front panel of said rack, on an information display device, the displayed article information including identification information identifying the articles displayed at the article display locations and price information indicating prices of the identified articles, said method comprising:

(a) storing the article information and position information indicating display positions of the articles on the rack;

(b) preparing article information about articles to be displayed on the basis of the stored article information and position information;

(c) determining display positions on said electronic display device for the prepared article information on the basis of the stored position information; and (d) displaying an electronic display of the prepared article information on said electronic display device at the determined display positions.

13. A method of displaying article information according to claim 12, further comprising:

(e) changing the stored position information when the display positions of the articles on the rack are changed.

14. A method of displaying article information according to claim 12, wherein the article information further includes feature information indicating features of the articles.

15. A method of displaying article information according to claim 14, wherein the feature information includes indications of discounts for the articles.

16. A method of displaying article information according to claim 15, wherein the feature information further includes the prices of the articles before the discounts and the prices of the articles after the discounts.

* * * * *